(12) United States Patent
Nakamura et al.

(10) Patent No.: US 6,268,581 B1
(45) Date of Patent: Jul. 31, 2001

(54) SEAM WELDING MACHINE

(75) Inventors: Masayuki Nakamura; Keiji Sodeno; Seiji Kodama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,420

(22) Filed: Aug. 5, 1999

(30) Foreign Application Priority Data

Feb. 23, 1999 (JP) .................................................. 11-044473

(51) Int. Cl.⁷ ...................................................... B23K 11/06
(52) U.S. Cl. ................................................. 219/81; 219/89
(58) Field of Search .................................. 219/89, 81, 83

(56) References Cited

U.S. PATENT DOCUMENTS

| 2,423,067 | * | 6/1947 | Hansen et al. | 219/81 |
|---|---|---|---|---|
| 2,684,424 | * | 7/1954 | Anderson | 219/81 |
| 3,564,189 | * | 2/1971 | Rhodes | 219/83 |
| 3,875,365 | * | 4/1975 | Beneteau | 219/89 |
| 3,909,579 | * | 9/1975 | Williams et al. | 219/83 |
| 4,135,076 | * | 1/1979 | Beneteau | 219/89 |
| 5,032,704 | * | 7/1991 | Neff et al. | 219/89 |
| 5,883,353 | * | 3/1999 | Yoshida et al. | 219/81 |

FOREIGN PATENT DOCUMENTS

| 4-72638 | 11/1992 | (JP) . |
| 9-195159 | 11/1997 | (JP) . |
| 10-58152 | 3/1998 | (JP) . |

* cited by examiner

*Primary Examiner*—Clifford C. Shaw
(74) *Attorney, Agent, or Firm*—Sughrue, Mion, Zinn, Macpeak & Seas, PLLC (57) ABSTRACT

A plurality of pistons are disposed in series in a circular electrode pressure cylinder and each of the pistons is separated. During low pressure output only one piston is used so that the friction force of the other pistons is not transmitted.

5 Claims, 11 Drawing Sheets

SEAM WELDING MACHINE

BACKGROUND OF THE INVENTION

1. Field of the Invention

The present invention relates to a seam welding machine for welding flat plates, etc., by seam welding using electrical resistance, and in particular relates to a construction and control configuration for a circular electrode pressure cylinder and pressure roller cylinder.

2. Description of the Related Art

Figure 8A:
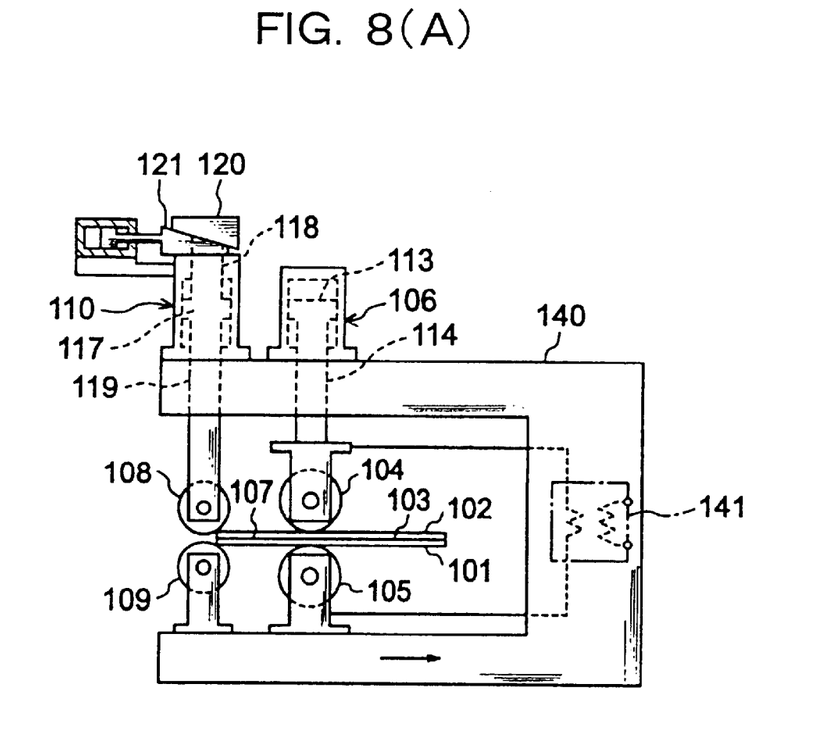
FIG. 8(A) is a diagram showing the construction of a conventional seam welding machine.
Figure 8B:
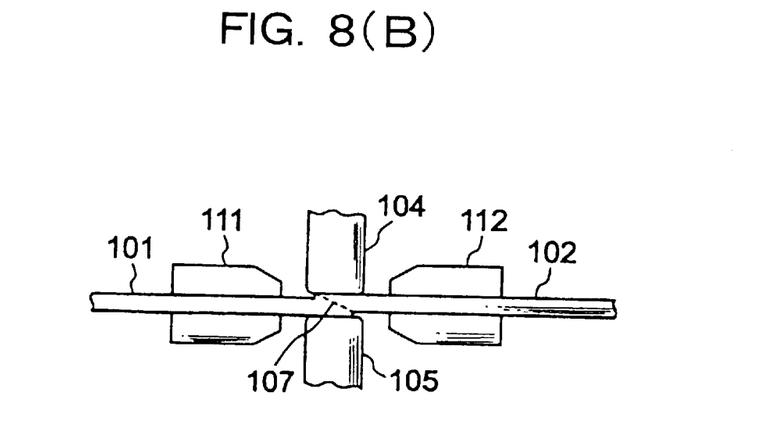
FIG. 8(B) is a diagram showing the state of FIG. 8(A) during welding.

FIGS. 8(A) and 8(B) show a conventional seam welding machine such as that disclosed in Japanese Patent No. HEI 4-72638, for example. As shown in FIG. 8 (A), the conventional seam welding machine comprises:

a pair of upper and lower circular electrodes 104, 105 for applying pressure from above and below to an overlapping portion 103 where edges of two flat plate-shaped members being welded 101, 102 overlap and welding the members by imparting an electric current thereto while moving;

a circular electrode pressure cylinder 106 for generating a force for pressing the upper circular electrode 104 against the overlapping portion 103 of the members being welded 101, 102;

a pair of upper and lower pressure rollers 108, 109 for compressing the weld 107 welded by the upper and lower circular electrodes 104, 105 by applying additional pressure thereto from above and below; and a pressure roller cylinder 110 for generating a force for pressing the upper pressure roller 108 against the weld 107.

Electric current is supplied to the upper and lower circular electrodes 104, 105 from a welding transformer 141. These devices are mounted on a C-shaped frame 140.

As shown in FIG. 8(B), the members being welded 101, 102 are held by clamps 111, 112 in order to secure them against the separating forces generated in the weld 107 during welding. The lower circular electrode 105 and the lower pressure roller 109 are adjusted to the level of the clamps.

Figure 9:
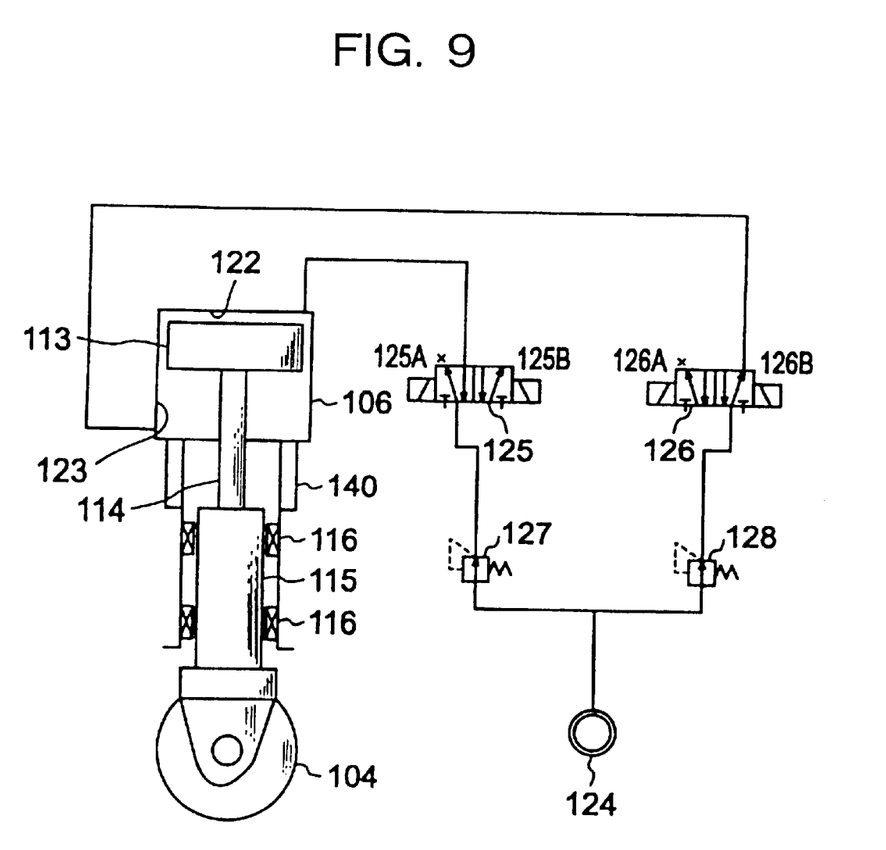
FIG. 9 is a diagram showing the construction and the control circuit of the circular electrode pressure cylinder in FIGS. 8(A) and (B)

As shown in detail in FIG. 9, the circular electrode pressure cylinder 106 is provided with a freely reciprocating piston 113 having a piston rod 114 projecting downwards from the lower end of the circular electrode pressure cylinder 106, and the piston rod 114 is connected to a circular electrode pressure shaft 115 on the upper circular electrode 104. The circular electrode pressure shaft 115 is supported so as to freely reciprocate and is guided in the direction of application of pressure by means of circular electrode guide bearings 116.

Furthermore, the pressure roller cylinder 110 is provided with a freely reciprocating piston 117. The piston 117 comprises an upper piston rod 118 projecting upwards from the upper end of the pressure roller cylinder 110 and a lower piston rod 119 connected to the upper pressure roller 108 projecting downwards from the lower end of the pressure roller cylinder 110. A stopper 120 for limiting the descent of the upper pressure roller 108 is disposed on the upper end of the upper piston rod 118. The stopper 120 is designed to contact a gauge 121 whose position is adjustable from above, and the position of the gauge 121 is set so that the spacing between the upper pressure roller 108 at its limit of descent and the lower pressure roller 109 is a value corresponding to the final thickness of the finished plate at the weld 107.

Next, the control circuit of the above circular electrode pressure cylinder 106 will be explained with reference to FIG. 9.

The circular electrode pressure cylinder 106 is divided into a pressure chamber 122 on the opposite side of the piston 113 from the upper circular electrode 104 (the head side) and a back pressure chamber 123 on the same side as the upper circular electrode 104. The control circuit comprises:

a pressure-side direction-switching electromagnetic valve 125 for controlling the inflow and outflow of pressure fluid from a pressure source 124 to the pressure chamber 122;

a back pressure-side direction-switching electromagnetic valve 126 for controlling the inflow and outflow of pressure fluid from the pressure source 124 to the back pressure chamber 123; and a pressure-side pressure-releasing valve 127 and a back pressure-side pressure-releasing valve 128 disposed in each of the circuits.

Furthermore, the pressure-side direction-switching electromagnetic valve 125 comprises an inflow-side coil 125B for switching the direction of flow of pressure fluid so that fluid flows into the pressure chamber 122, and an outflow-side coil 125A for switching the direction of flow of pressure fluid so that fluid flows out of the pressure chamber 122. Furthermore, the back pressure-side direction-switching electromagnetic valve 126 comprises an inflow-side coil 126B for switching the direction of flow of pressure fluid so that fluid flows into the back pressure chamber 123, and an outflow-side coil 126A for switching the direction of flow of pressure fluid so that fluid flows out of the back pressure chamber 123.

When low pressure output is required such as in cases where the members 101, 102 being welded are thin plates, the inflow-side coil 125B of the pressure-side direction-switching electromagnetic valve 125 is energized allowing pressure fluid to flow into the pressure chamber 122 and the outflow-side coil 126A of the back pressure-side direction-switching electromagnetic valve 126 is energized allowing pressure fluid to flow out of the back pressure chamber 123, allowing the upper circular electrode 104 to descend, then pressure fluid is introduced to the back pressure chamber 123 of the circular electrode pressure cylinder 106 by re-energizing the inflow-side coil 126B of the back pressure-side direction-switching electromagnetic valve 126. The downward output (pressure output) of the circular electrode pressure cylinder 106 can be freely set if the pressure is low by means of the set value of the pressure-side pressure-releasing valve 127 and the back pressure-side pressure-releasing valve 128 in each of the circuits and by the pressure-receiving surface areas of the pressure chamber 122 and the back pressure chamber 123 in the circular electrode pressure cylinder 106. The above circuit is usually adopted because of problems such as poor performance of the pressure-releasing valves in the low pressure region when only the pressure of the pressure chamber 122 is being controlled which make it impossible to set the pressure at less than the weight of the moving portion of the circular electrode pressure cylinder 106.

Another plausible method of changing the pressure output of the circular electrode pressure cylinder 106 is a construction in which two cylinder portions having different pressure-receiving surface areas are disposed in series.

Figure 10A:
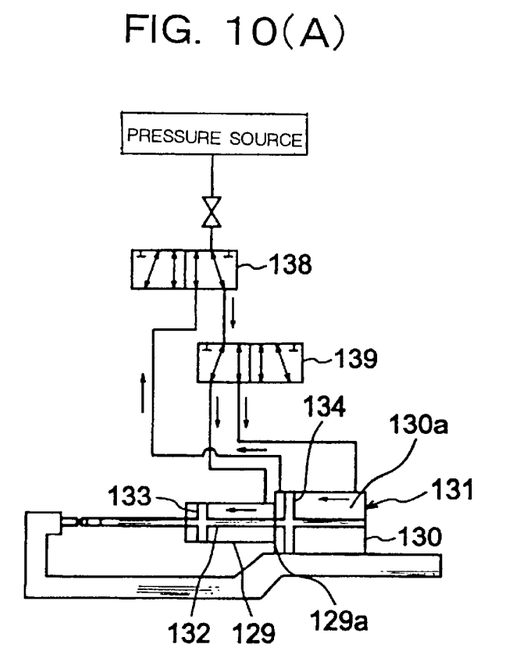
FIGS. 10(A) and (B) are diagrams showing the cylinder construction of another conventional seam welding machine having variable pressure output.
Figure 10B:
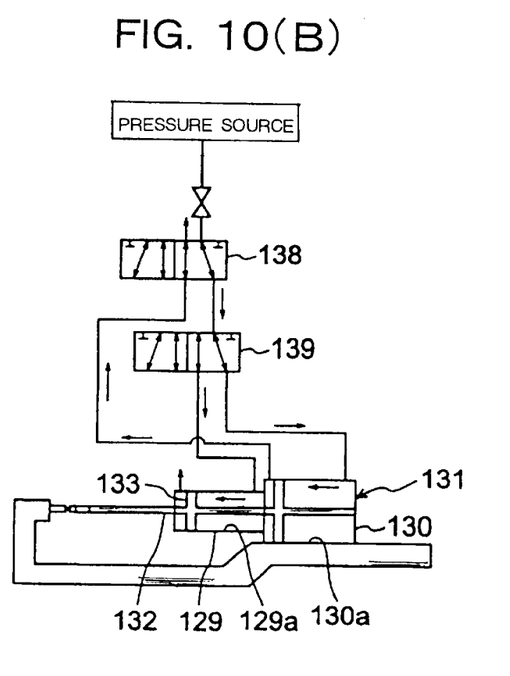

FIG. 10 shows a construction of a pressure cylinder 131 in which two cylinders 129, 130 are joined and a control system therefor such as that disclosed in Japanese Patent Laid-Open No. HEI 9-295159, for example.

In this conventional example, in addition to disposing the two cylinders 129, 130 on the longitudinal axis of a cylinder rod 132, two pistons 133, 134 inserted into each of the cylinders 129, 130 are formed integrally with the cylinder rod 132. The pressure output can be varied by changing the pressure-receiving surface areas of the two cylinders 129, 130. In other words, the overall pressure output of the pressure cylinder 131 is set by introducing compressed gas into a cylinder chamber 129a in one of the cylinders 129 by means of direction control valves 138, 139 as shown in FIG. 10(A) or by introducing compressed gas into a cylinder chamber 130a in the other cylinder 130 by means of the direction control valves 138, 139 as shown in FIG. 10(B).

However, when used in a seam welding machine, a conventional circular electrode pressure cylinder 106 such as that shown in FIG. 9 suffers from the problems described below.

It is necessary to set the pressure output of the upper circular electrode 104 at a value suited to the thickness and properties of the members being welded 101, 102. It is extremely important to maintain the applied pressure at the appropriate value because the applied pressure greatly affects the quality of the weld. However, in cases where the properties of the members being welded 101, 102, particularly the thickness thereof, vary over a wide range, when one tries to obtain low pressure for thin plates from the same circular electrode pressure cylinder 106 from which maximum output pressure is obtained for maximum plate thicknesses, the output pressure cannot be set accurately because resistance from sliding portions such as packing is constant regardless of the set value of the pressure output, making the influence of sliding resistance on pressure output greater in the low pressure regions corresponding to thin plates.

Figure 11:
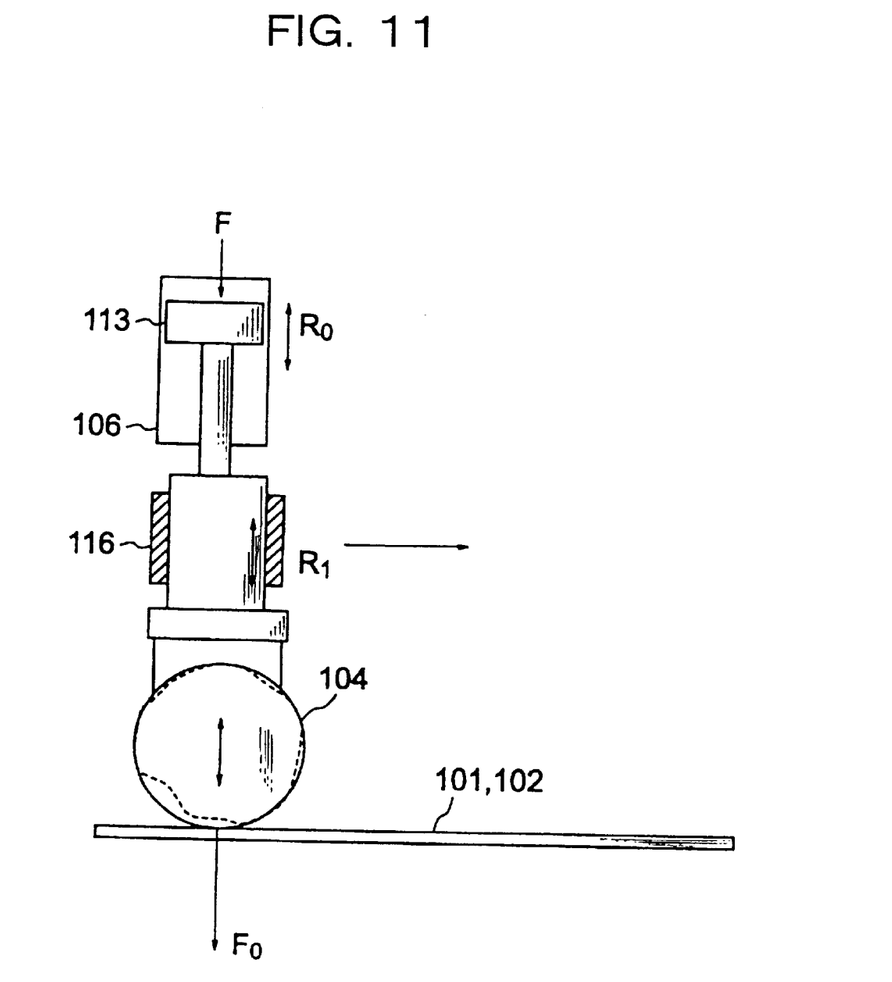
FIG. 11 is a diagram explaining the effects of sliding resistance on the pressure output of the circular electrode pressure cylinder in FIG. 9.

FIG. 11 is a diagram explaining the effects of sliding resistance on pressure output. In FIG. 11, the pressure output $F_0$ acting at the point where the upper circular electrode 104 contacts the members being welded 101, 102 varies according to the values of the sliding resistance $R_0$ of the packing of the piston 113, etc., and the sliding resistance $R_1$ of the circular electrode guide bearings 116. During welding, the upper circular electrode 104 applies a pressure output $F_0$ to the members being welded 101,102 as it moves horizontally (in the direction indicated by the arrow in the diagram). The piston 113 moves up and down due to deformation of the shape of outer circumference of the upper circular electrode 104 (deformation to a non-circular shape such as that indicated by the broken lines in the diagram, for example) or due to irregularities on the surfaces of the members being welded 101, 102. When the piston 113 is moving downwards, the sliding resistances $R_0$, $R_1$ act in a direction which subtracts from the theoretical value of the pressure output F of the circular electrode pressure cylinder 106.

When the piston 113 is moving upwards, on the other hand, the sliding resistances $R_0$, $R_1$ act in a direction which adds to the theoretical value of the pressure output F of the circular electrode pressure cylinder 106. In other words, the variation in the value of the pressure output F due to these sliding resistances is $2\times(R_0 + R_1)$. Of these variations, the value of the sliding resistance $R_0$ of the packing of the piston 113, etc., is generally constant depending on the circular electrode pressure cylinder 106. Consequently, in the conventional art such as that explained in FIG. 9, the proportion of variation in pressure output is extremely large when low pressure output is required, making it difficult to maintain weld quality for thin plates which require low pressure output.

Furthermore, in the conventional art such as that explained in FIG. 10, since the pressure cylinder 131 comprises two pistons 133, 134, sliding resistance in the pistons is increased further. Moreover, in this pressure cylinder 131, because two cylinders 129, 130 are formed around one cylinder rod 132, two shaft bushes and the two piston sliding portions mentioned above are disposed on the cylinder rod 132, making machining precision extremely difficult. If the concentricity at these four points is disturbed, sliding resistance increases and assembly is also made difficult.

The above is an explanation of problems with the pressure output of the circular electrode. Next, problems with the pressure output of the pressure cylinder will be explained.

As explained for FIG. 8, the thickness of the weld 107 is determined by setting the position of the gauge 121 to fix the position of the lower limit of the upper pressure roller 108, but due to the pressure output of the upper circular electrode 104 and the upper pressure roller 108, the frame 140 supporting them bends. One problem is that the value thereof varies depending on the value of the pressure output and causes variations in the finished thickness of the weld 107.

At the same time, another conventional method is known in which the weld is compressed by controlling pressure instead of controlling the position of the upper pressure roller 108 using the above stopper 120 and gauge 121.

However, in that case, one problem is that if pressure is applied to the members being welded 101, 102 before the upper pressure roller 108 mounts when the members being welded 101, 102 are thin, creases form at the ends of the members being welded 101, 102, and in worse cases the thin members being welded 101, 102 may be ruptured by the compressive force.

Thus, the pressure output has conventionally been applied after the upper pressure roller 108 mounts, but because the lag time is great between output of the pressure signal and actual application of pressure on the weld 107, a portion arises at the beginning of the weld 107 wherein the effect of the upper pressure roller 108 cannot be realized.

The length L thereof is given by $L = t \times V$ (here t is the lag time and V is the welding speed), and because the welding speed V must be changed depending on the members being welded 101, 102, it is necessary to reduce the lag time as much as possible in order to reduce the length L.

SUMMARY OF THE INVENTION

The present invention aims to solve the above problems and an object of the present invention is to provide a seam welding machine capable of increasing the accuracy of the setting of the pressure output of the circular electrode by reducing sliding friction in the circular electrode pressure cylinder as much as possible.

Another object of the present invention is to provide a seam welding machine capable of shortening as much as possible the time lag until actual application of pressure when the weld is re-pressed by a pressure roller.

To this end, according to the present invention, there is provided a seam welding machine comprising: circular electrodes for applying pressure to an overlapping portion where edges of members being welded overlap and welding the overlapping portion by imparting an electric current thereto while moving; and a circular electrode pressure cylinder for generating a force for pressing the circular electrodes against the overlapping portion of the members being welded, the circular electrode pressure cylinder having: a plurality of pistons each capable of operating separately disposed in series along the direction of pressure applied to the circular electrodes so as to contact each other freely; and a plurality of cylinder portions for housing the pistons, the pressure output of the circular electrode pressure cylinder being capable of being set in a plurality of stages by allowing pistons in the end away from the circular electrodes to contact the pistons in the near end appropriately so as to be operate together and adding together the pressure output of each of the pistons.

According to another aspect of the present invention, there is provided a seam welding machine comprising: circular electrodes for applying pressure to an overlapping portion where edges of members being welded overlap and welding said overlapping portion by imparting an electric current thereto while moving; a circular electrode pressure cylinder for generating a force for pressing the circular electrodes against the overlapping portion of the members being welded; a pressure roller for compressing a weld made by the circular electrodes by the additional application of pressure; and a pressure roller cylinder for generating a force for pressing the pressure roller against the weld, comprising a pressure roller cylinder control means for allowing the force of the pressure roller to be applied to the weld by introducing pressure fluid into the pressure side and the back pressure side of the pressure roller cylinder before the pressure roller reaches the position of the weld and releasing the pressure fluid from said back pressure side of the pressure roller cylinder when the pressure roller reaches the position of the weld.

DETAILED DESCRIPTION OF THE PREFERRED EMBODIMENTS

The present invention will now be explained using the preferred embodiments shown in the drawings.

Embodiment 1

Figure 3A:
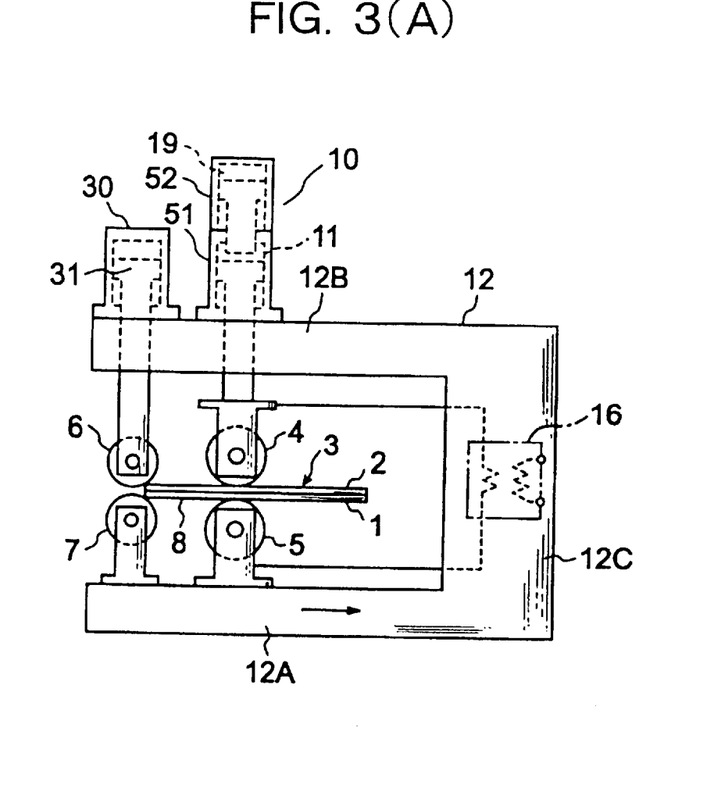
FIG. 3(A) is a diagram showing the overall construction of a seam welding machine to which the circular electrode pressure cylinder in FIG. 1 can be applied.
Figure 3B:
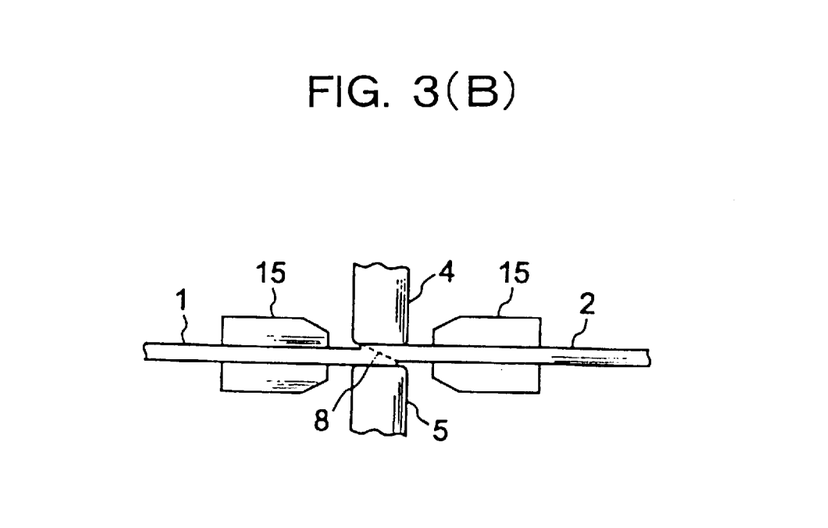
FIG. 3(B) is a diagram showing the state during welding.

FIGS. 3(A) and (B) show the overall construction of a seam welding machine according to Embodiment 1 of the present invention.

As shown in FIG. 3(A), the seam welding machine comprises:

a pair of upper and lower circular electrodes 4, 5 for applying pressure to an overlapping portion 3 where the edges of two flat plate-shaped members being welded 1, 2 overlap and welding the overlapping portion 3 by imparting an electric current thereto while moving;

a circular electrode pressure cylinder 10 for generating a force for pressing the upper circular electrode 4 against the overlapping portion 3 of the members being welded 1, 2;

a pair of upper and lower pressure rollers 6, 7 for compressing the weld 8 welded by the upper and lower circular electrodes 4, 5 by applying additional pressure thereto from above and below; and a pressure roller cylinder 30 for generating a force for pressing the upper pressure roller 6 against the weld 8.

These devices are mounted on a C-shaped frame 12. The lower circular electrode 5 and the lower pressure roller 7 are secured to the base 12A of the frame 12, and the upper circular electrode 4 and the circular electrode pressure cylinder 10, as well as the upper pressure roller 6 and the pressure roller cylinder 30, are secured above the base 12A on the head 12B of the frame 12 which faces the base 12A parallel thereto and separated therefrom by a predetermined distance. The base 12A and the head 12B of the frame 12 are connected at one end by a trunk 12C which extends in the vertical direction to form an overall C-shape. Furthermore, a welding transformer 16 for supplying electric current to the upper and lower circular electrodes 4, 5 is mounted in the frame 12.

As shown in FIG. 3(B), the members being welded 1, 2 are held by clamps 15, 15, and the lower circular electrode 5 and the lower pressure roller 7 are adjusted to the level of the clamps.

In this embodiment, the circular electrode pressure cylinder 10 drives the upper circular electrode 4 and the pressure roller cylinder 30 drives the upper pressure roller 6, but the construction may be altered so that the lower circular electrode 5 and the lower pressure roller 7 are driven instead, or so that all four are driven.

Figure 1:
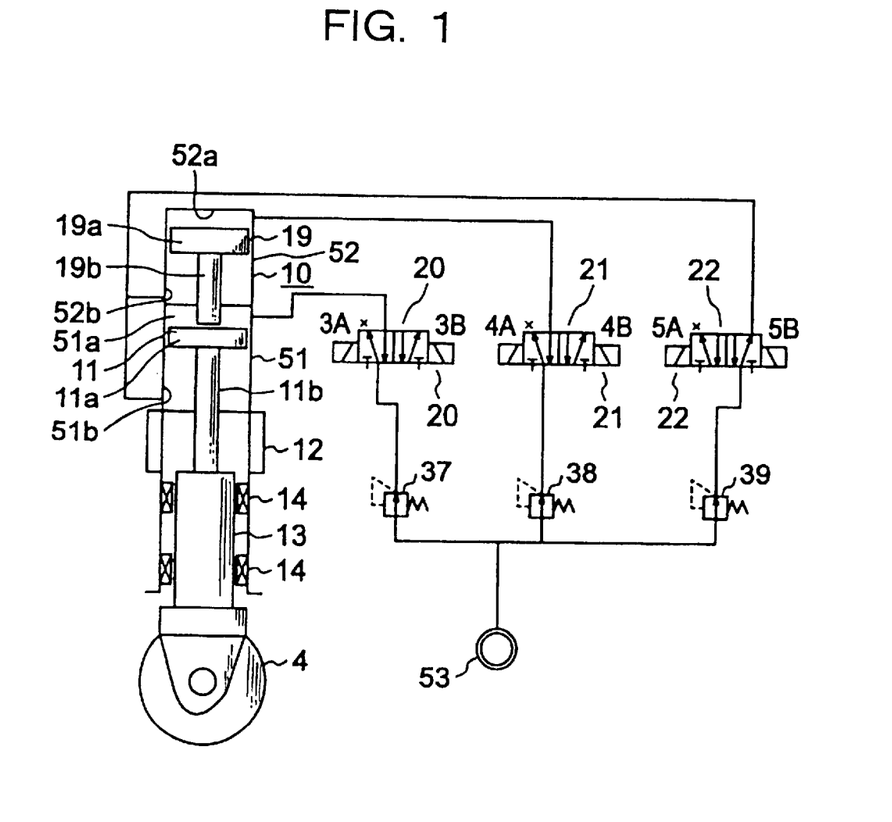
FIG. 1 is a diagram showing the construction and the control circuit of a circular electrode pressure cylinder for a seam welding machine according to Embodiment 1 of the present invention.

The circular electrode pressure cylinder 10 comprises first and second pistons 11, 19 disposed in series along the direction of pressure on the upper circular electrode 4 so as to contact each other freely functioning as a plurality of pistons each capable of operating separately, and first and second cylinder portions 51, 52 functioning as a plurality of cylinder portions for housing the first and second pistons so as to reciprocate freely. By allowing the second piston 19 in the end away from the upper circular electrode 4 to contact the first piston 11 in the near end appropriately, the pressure output of the first and second pistons can be added together to set the overall pressure output in two stages.

As shown in FIG. 1, the first and second pistons 11, 19 comprise first and second piston main bodies 11*a*, 19*a* inserted into the hollow first and second cylinder portions 51, 52, respectively, so as to slide freely, and first and second piston rods 11b, 19b extending downwards from the first and second piston main bodies 11a, 19a. The first piston rod 11b projects downwards from the first cylinder portion 51 and the lower end thereof is connected to the upper end of a circular electrode pressure shaft 13 on the upper circular electrode 4.

At the same time, the second piston rod 19b projects into the first cylinder portion 51 and the lower end thereof is able to contact the first piston main body 11a. The circular electrode pressure shaft 13 is supported so as to freely reciprocate and is guided in the direction of pressure by means of circular electrode guide bearings 14.

Next, the control circuit for the above circular electrode pressure cylinder 10 will be explained with reference to FIG. 1.

The first and second cylinder portions 51, 52 of the circular electrode pressure cylinder 10 are respectively divided into pressure chambers 51a, 52a on the opposite side of the first and second piston main bodies 11a, 19a from the upper circular electrode 4 (the head side) and back pressure chambers 51b, 52b on the same side as the upper circular electrode 4. The control circuit comprises:

- a first pressure-side direction-switching electromagnetic valve 20 for the inflow and outflow of pressure fluid from a pressure source 53 to the pressure chamber 51 a of the first cylinder portion 51;
- a second pressure-side direction-switching electromagnetic valve 21 for controlling the inflow and outflow of pressure fluid from the pressure source 53 to the pressure chamber 52a of the second cylinder portion 52;
- a back pressure-side direction-switching electromagnetic valve 22 for controlling the inflow and outflow of pressure fluid from the pressure source 53 to both of the back pressure chambers 51b, 52b of the first and second cylinder portions 51, 52; and
- first and second pressure-side pressure-releasing valves 37, 38 and a back pressure-side pressure-releasing valve 39 disposed in each of the circuits.

The first and second pressure-side direction-switching electromagnetic valves 20, 21 comprise inflow-side coils 3B, 4B for switching the direction of flow of pressure fluid so that fluid flows into the pressure chambers 51a, 52a, and outflow-side coils 3A, 4A for switching the direction of flow of pressure fluid so that fluid flows out of the pressure chambers 51a, 52a, respectively. Furthermore, the back pressure-side direction-switching electromagnetic valve 22 comprises an inflow-side coil 5B for switching the direction of flow of pressure fluid so that fluid flows into the back pressure chambers 51b, 52b, and an outflow-side coil 5A for switching the direction of flow of pressure fluid so that fluid flows out of the back pressure chambers 51b, 52b.

Next the operation of Embodiment 1 will be explained.

FIG. 1 shows the state when no pressure output is being applied, the outflow-side coils 3A, 4A of the first and second pressure-side direction-switching electromagnetic valves 20, 21 and the inflow-side coil 5B of the back pressure-side direction-switching electromagnetic valve 22 being energized so that pressure fluid flows out of the pressure chambers 51a, 52a of the first and second cylinder portions 51, 52 and pressure fluid flows into the back pressure chambers 51b, 52b, positioning the first and second pistons 11, 19 at their upper limit, thereby also positioning the upper circular electrode 4 connected to the first piston 11 at its upper limit. Hereinafter, this position will be called the original position.

From this state, when low pressure output is required, the inflow-side coil 3B of the first pressure-side direction-switching electromagnetic valve 20 is energized. Thus, pressure fluid flows into the pressure chamber 51a of the first cylinder portion 51, and the first piston 11 descends due to the difference between that pressure and the pressure in the back pressure chamber 51b. This difference in pressure is the pressure output, and a predetermined pressure output is obtained by setting the pressure of the first pressure-side pressure-releasing valve 37 and the back pressure-side pressure-releasing valve 39.

Figure 2A:
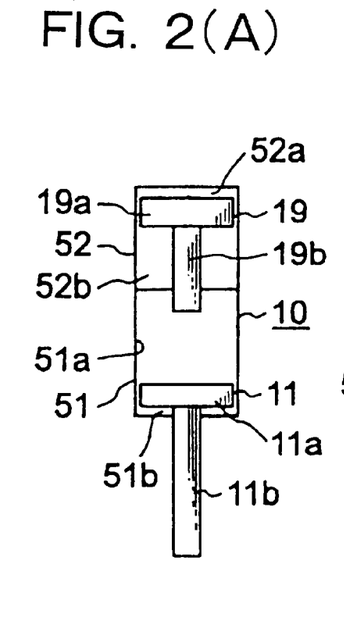
FIGS. 2(A) and (B) are diagrams explaining the operation of the circular electrode pressure cylinder in FIG. 1.

FIG. 2 shows the circular electrode pressure cylinder 10, FIG. 2(A) showing the state thereof after the above (low pressure output) operation. Only the first piston 11 is operating; the second piston 19 maintains its original position.

Figure 2B:
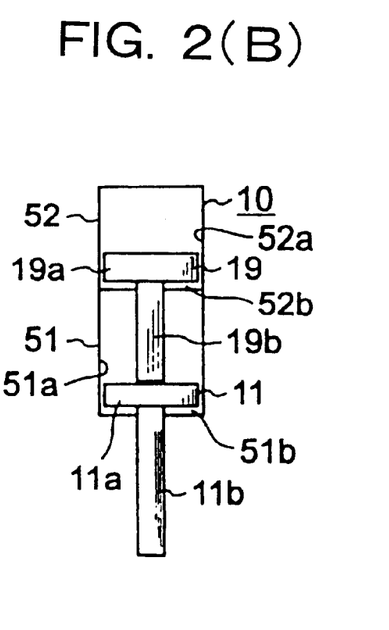

When high pressure output is required, the first piston 11 and the second piston 19 are lowered together as shown in FIG. 2(B) by energizing the inflow-side coil 3B of the first pressure-side direction-switching electromagnetic valve 20, the inflow-side coil 4B of the second pressure-side direction-switching electromagnetic valve 21, and the outflow-side coil 5A of the back pressure-side direction-switching electromagnetic valve 22, thereby lowering the upper circular electrode 4 connected thereto. This construction enables pressure output to be set up to the maximum by raising the release pressure at the first and second pressure-side pressure-releasing valves 37, 38.

Embodiment 2

Figure 4:
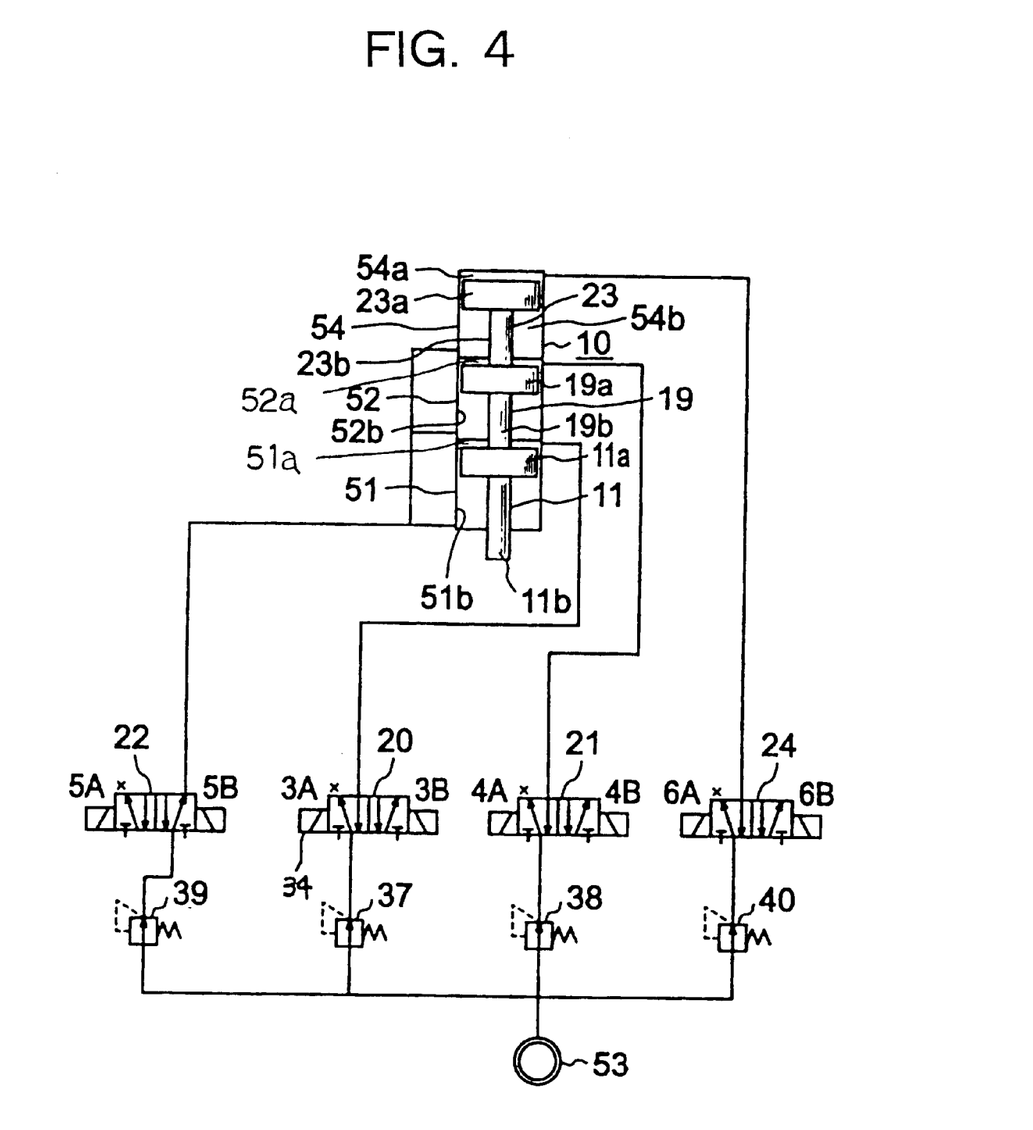
FIG. 4 is a diagram showing the construction and the control circuit of a circular electrode pressure cylinder for a seam welding machine according to Embodiment 2 of the present invention.
Figure 5A:
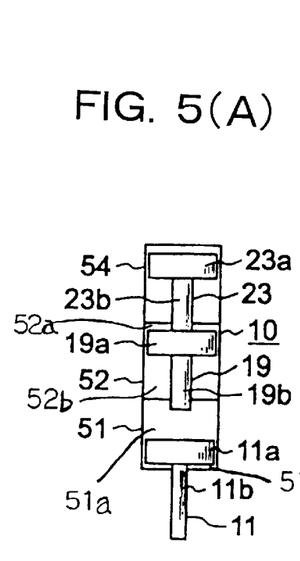
FIGS. 5(A), (B), and (C) are diagrams explaining the operation of the circular electrode pressure cylinder in FIG. 4.
Figure 5B:
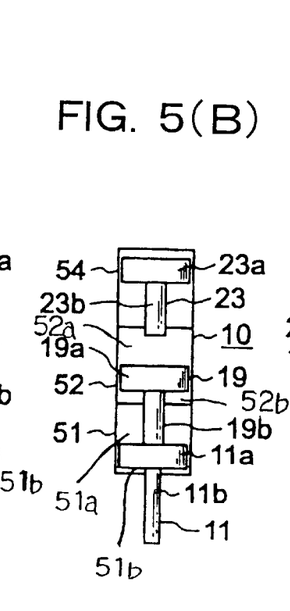
Figure 5C:
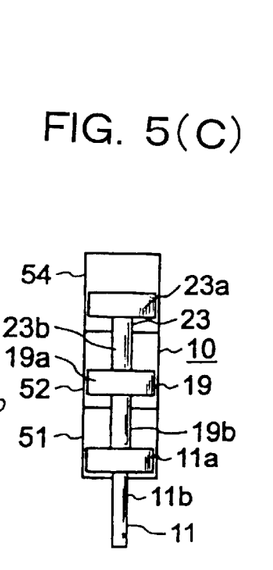

FIGS. 4 and 5 show the construction of a circular electrode pressure cylinder and the control circuit construction for a seam welding machine according to Embodiment 2 of the present invention.

Whereas the circular electrode pressure cylinder 10 in Embodiment 1 employs a two-stage piston, a three-stage piston is employed in Embodiment 2.

That is, a third piston 23 operating separately from the first and second pistons 11, 19 of Embodiment 1 is disposed in series on the opposite side of the second piston 19 from the upper circular electrode 4, and a hollow third cylinder portion 54 is provided for housing the third piston 23 so as to slide freely.

The third piston 23 comprises a third piston main body 23a inserted into the hollow third cylinder portion 54 so as to reciprocate freely, and a third piston rod 23b extending downwards from the third piston main body 23a. The third piston rod 23b projects beyond the bottom of the third cylinder portion 54 into the second cylinder portion 52 and the lower end thereof is able to contact the second piston main body 19a. The third cylinder portion 54 is divided into a pressure chamber 54a on the opposite side of the third piston main body 23a from the upper circular electrode 4 and a back pressure chamber 54b on the same side as the upper circular electrode 4. Furthermore, a third pressure-side direction-switching electromagnetic valve 24 is provided for controlling the inflow and outflow of pressure fluid from the pressure source 53 to the pressure chamber 54a of the third cylinder portion 54, and a third pressure-side pressure-releasing valve 40 is disposed between the third pressure-side direction-switching electromagnetic valve 24 and the pressure source 53. The back pressure chamber 54b of the third cylinder portion 54 is controlled together with the back pressure chambers 51b, 52b of the first and second cylinder portions 51, 52 by the above-mentioned back pressure-side direction-switching electromagnetic valve 22 and the back pressure-side pressure-releasing valve 39. Furthermore, the third pressure-side direction-switching electromagnetic valves 24 also comprises an inflow-side coil 6B for switching the direction of flow of pressure fluid so that fluid flows into the pressure chamber 54a, and an outflow-side coil 6A for switching the direction of flow of pressure fluid so that fluid flows out of the pressure chamber 54a.

Next, the operation of Embodiment 2 will be explained.

FIG. 4 shows the state when no pressure output is being applied, the outflow-side coils 3A, 4A, 6A of the first, second, and third pressure-side direction-switching electromagnetic valves 20, 21, 24 and the inflow-side coil 5B of the back pressure-side direction-switching electromagnetic valve 22 being energized so that pressure fluid flows out of the pressure chambers 51a, 52a, 54a of the first, second, and third cylinder portions 51, 52, 54 and pressure fluid flows into the back pressure chambers 51b, 52b, 54b. Consequently, the first, second, and third pistons 11, 19, 23 are positioned at their upper limit, the upper circular electrode 4 connected to the first piston 11 is also positioned at its upper limit.

From this state, when low pressure output is required, the inflow-side coil 3B of the first pressure-side direction-switching electromagnetic valve 20 is energized. Thus, pressure fluid flows into the pressure chamber 51a of the first cylinder portion 51, and the first piston 11 descends due to the difference between that pressure and the pressure in the back pressure chamber 5b. This difference in pressure is the pressure output, and a predetermined minimum pressure output is obtained by setting the pressure of the first pressure-side pressure-releasing valve 37 and the back pressure-side pressure-releasing valve 39.

FIG. 5 shows the circular electrode pressure cylinder 10, FIG. 5 (A) showing the state thereof after the above (low pressure output) operation. Only the first piston 11 is operating; the second and third pistons 19, 23 maintain their original position.

When medium pressure output to the circular electrode is required, the inflow-side coils 3B, 4B of the first and second pressure-side direction-switching electromagnetic valves 20, 21 are energized. Thus, pressure fluid flows into the pressure chambers 51a, 52a of the first and second cylinder portions 51, 52, and the first and second pistons 11, 19 descend due to the difference between that pressure and the pressure in the back pressure chambers 51b, 52b. The pressure output at this time is set by the first and second pressure-side pressure-releasing valves 37, 38 and the back pressure-side pressure-releasing valve 39. The operating state of each of the pistons is as shown is FIG. 5(B), the pressure output obtained being the sum of the pressure output of the first piston 11 and the pressure output of the second piston 19.

When high pressure output is required, the inflow-side coils 3B, 4B, 6B of the first, second, and third pressure-side direction-switching electromagnetic valves 20, 21, 24 and the outflow-side coil 5A of the back pressure-side direction-switching electromagnetic valve 22 are energized. Thus, pressure fluid flows into the pressure chambers 51a, 52a, 54a of the first, second, and third cylinder portions 51, 52, 54, and pressure fluid flows out of the back pressure chambers 51b, 52b, 54b of the first, second, and third cylinder portions 51, 52, 54, and the first, second, and third pistons 11,19, 23 all descend. This construction enables pressure output to be set up to a maximum by raising the release pressure at the first, second, and third pressure-side pressure-releasing valves 37, 38, 40.

The construction is the same even if the number of piston stages is increased.

Embodiment 3

Figure 6:
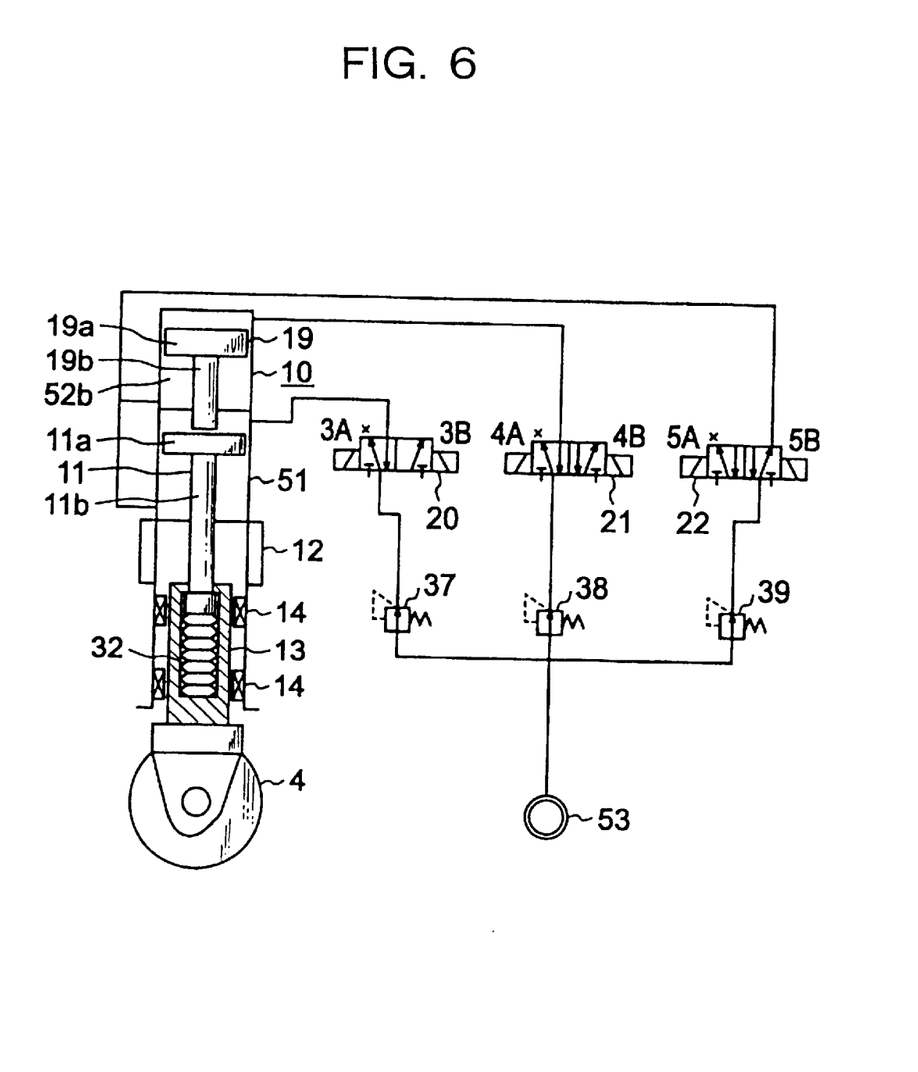
FIG. 6 is a diagram showing the construction and the control circuit of a circular electrode pressure cylinder for a seam welding machine according to Embodiment 3 of the present invention.

FIG. 6 shows a circular electrode pressure cylinder for a seam welding machine according to Embodiment 3 of the present invention and a control circuit therefor.

In this embodiment, a spring 32 is disposed between the upper circular electrode 4 and the first piston 11 nearest to the upper circular electrode 4 so that changes in the position of the direction of application of pressure to the upper circular electrode 4 relative to the set pressure output of the circular electrode pressure cylinder 10 during welding can be matched by changes in the flexure of the spring 32.

The spring 32 is mounted inside the circular electrode pressure shaft 13, and when the upper circular electrode 4 is pressed in the direction of application of pressure by the circular electrode pressure cylinder 10, the spring 32 is pressed by the piston rod 11b of the first piston 11 and flexes. Vertical movement of the upper circular electrode 4 during welding is countered by the compression and extension of the spring 32. Consequently, a mechanism is provided for dealing with the vertical movement of the upper circular electrode 4 to avoid the influence of frictional resistance from the circular electrode pressure cylinder 10.

Because the rest of the construction and the action thereof are exactly the same as for Embodiment 1 above, the same numbering has been used and explanation thereof will be omitted.

Embodiment 4

Figure 7:
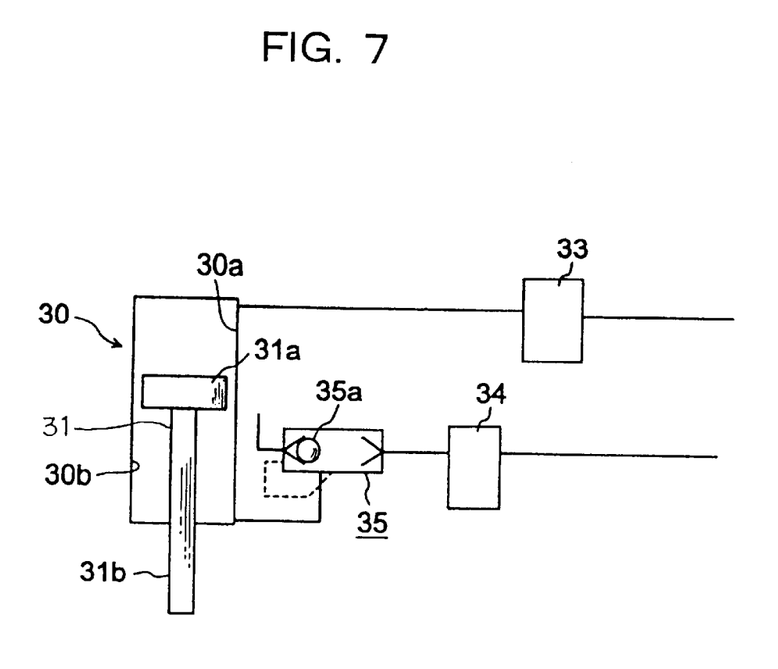
FIG. 7 is a diagram showing the construction and the control circuit of a pressure roller cylinder for a seam welding machine according to Embodiment 4 of the present invention.

FIG. 7 shows a circular electrode pressure cylinder for a seam welding machine according to Embodiment 3 of the present invention and a control circuit therefor.

In this embodiment, a control circuit is provided as a pressure roller cylinder control means wherein pressure fluid is introduced into the pressure side and the back pressure side of the pressure roller cylinder 30 before the weld 8 in FIG. 3 reaches the position of the upper pressure roller 6, then when the weld 8 reaches the position of the upper pressure roller 6, the force of the upper pressure roller 6 is applied to the weld 8 by releasing pressure fluid from the back pressure side of the pressure roller cylinder 30.

The pressure roller cylinder 30 is provided with a freely reciprocating piston 31. The piston 31 comprises a piston main body 31a and a piston rod 31b projecting downwards from the piston main body 31a. The interior of the pressure roller cylinder 30 is divided into a pressure chamber 30a on the opposite side of the piston main body 31a from the upper pressure roller 6 and a back pressure chamber 30b on the same side as the upper pressure roller 6, and is provided with a pressure-side direction-switching electromagnetic valve 33 for controlling the inflow and outflow of pressure fluid from a pressure source (not shown) to the pressure chamber 30a, and a back pressure-side direction-switching electromagnetic valve 34 for controlling the inflow and outflow of pressure fluid from the pressure source to the back pressure chamber 30b.

A rapid exhaust valve 35 is disposed in the immediate vicinity of the back pressure chamber 30b of the pressure roller cylinder 30, the rapid exhaust valve 35 being used to release a pressure fluid such as compressed air from the back pressure side. The pressure-side direction-switching electromagnetic valve 33, the back pressure-side direction-switching electromagnetic valve 34, and the rapid exhaust valve 35, etc., forming the control circuit constitute a pressure roller cylinder control means.

In Embodiment 4, first the upper pressure roller 6 is lowered before it mounts the members being welded 1, 2. Next, the C-shaped frame 12 moves such that the upper and lower pressure rollers 6, 7 follow immediately after the upper and lower circular electrodes 4, 5. At that time, controlled fluid pressure is introduced into the pressure chamber 30a of the pressure roller cylinder 30 of the upper pressure roller 6. At the same time, pressure fluid with slightly lower pressure than the pressure in the pressure chamber 30a is introduced into the back pressure chamber 30b of the pressure roller cylinder 30.

Thus, the pressure output of the upper pressure roller 6 is lowered to its extreme limit, and in this state the upper pressure roller 6 is lowered to the stroke limit of the pressure roller cylinder 30 or until the upper pressure roller 6 contacts the lower pressure roller 7. Then the upper pressure roller 6 mounts the members being welded 1, 2. As shown in FIG. 7, at that time pressure is released by the switching of the coil of the back pressure-side direction-switching electromagnetic valve 34, and a spool 35a in the rapid exhaust valve 35 disposed in the immediate vicinity of the back pressure chamber 30b on the back pressure side of the pressure roller cylinder 30 is moved by back pressure to the release side and expels gas, whereby the pressure on the back pressure side drops rapidly and a predetermined pressure output acts on the upper pressure roller 6.

Similar effects can be obtained by disposing the back pressure-side direction-switching electromagnetic valve 34, instead of the rapid exhaust valve 35, in the immediate vicinity of the pressure roller cylinder 30.

Moreover, in each of the above embodiments, gas pressure such as that of air or hydraulic pressure such as oil pressure may be used as the pressure fluid. Furthermore, the circular electrode pressure cylinder of Embodiment 1 may be used as the circular electrode pressure cylinder in any of the above embodiments.

As explained above, a seam welding machine according to one aspect of the present invention comprises: circular electrodes for applying pressure to an overlapping portion where edges of members being welded overlap and welding said overlapping portion by imparting an electric current thereto while moving; and a circular electrode pressure cylinder for generating a force for pressing the circular electrodes against the overlapping portion of the members being welded, the circular electrode pressure cylinder having: a plurality of pistons each capable of operating separately disposed in series along the direction of pressure applied to the circular electrodes so as to contact each other freely; and a plurality of cylinder portions for housing the pistons, the pressure output of the circular electrode pressure cylinder being capable of being set in a plurality of stages by allowing pistons in the end away from the circular electrodes to contact said pistons in the near end appropriately so as to be operate together and adding together the pressure output of each of said pistons. Therefore, since the multi-stage piston is only partially used when applying low pressure output to the circular electrode, the frictional force of unused piston packing, etc., is eliminated, enabling fluctuations in pressure output due to friction to be reduced during welding. Furthermore, because the diameter of the circular electrode pressure cylinder is reduced by comparison to a single-stage model, the variation in pressure per unit of pressure setting is smaller, improving the setting precision of the pressure output. Still furthermore, because a plurality of pistons in the circular electrode pressure cylinder are separated and are able to operate independently, machining precision such as concentricity among the pistons is not absolutely necessary.

Also, according to one form of the seam welding machine, a spring may be disposed between the circular electrodes and the piston closest to the electrodes to enable fluctuations in the position of the circular electrodes in the direction of application of pressure during welding relative to the set pressure output of the circular electrode pressure cylinder to be matched by variations in the flexure of said spring. Therefore, even if a small amount of vertical movement of the circular electrodes occurs during welding, the movement is matched by the elasticity of the spring which is closer to the circular electrode than the circular electrode pressure cylinder, removing the need for vertical movement of the circular electrode pressure cylinder and thereby alleviating fluctuations in the pressure output of the circular electrode due to fluctuations in frictional force.

A seam welding machine according to another aspect of the present invention comprises: circular electrodes for applying pressure to an overlapping portion where edges of members being welded overlap and welding the overlapping portion by imparting an electric current thereto while moving; a circular electrode pressure cylinder for generating a force for pressing the circular electrodes against the overlapping portion of the members being welded; a pressure roller for compressing a weld made by the circular electrodes by the additional application of pressure; and a pressure roller cylinder for generating a force for pressing the pressure roller against the weld, comprising a pressure roller cylinder control means for allowing the force of the pressure roller to be applied to the weld by introducing pressure fluid into the pressure side and the back pressure side of the pressure roller cylinder before the pressure roller reaches the position of the weld and releasing the pressure fluid from the back pressure side of the pressure roller cylinder when the pressure roller reaches the position of the weld. Therefore, when the pressure roller mounts the objects being welded, the pressure output from the pressure roller is extremely small, enabling it to mount the objects being welded easily. Furthermore, since the volume of air on the back pressure side of the pressurized pressure roller cylinder is small, the operation of removing pressure from the back pressure side can be carried out rapidly. Thus, welding is practically enabled from the edge of the members being welded.

According to one form of the seam welding machine, a rapid exhaust valve may be disposed in the immediate vicinity of the pressure roller cylinder, and the pressure fluid may be released from the back pressure side using the rapid exhaust valve. Therefore, time lag before the commencement of pressure application by the pressure roller can be made shorter.

Also, according to another form of the seam welding machine, the circular electrode pressure cylinder may be used as the circular electrode pressure cylinder of the seam welding machine by one aspect of the present invention. Therefore, improvement of the setting precision of the pressure output specific to the circular electrode pressure cylinder and shortening of the time lag before the commencement of pressure application specific to the pressure roller cylinder can be realized simultaneously.

What is claimed is:

1. A seam welding machine comprising:

circular electrodes for applying pressure to an overlapping portion where edges of members being welded overlap and welding said overlapping portion by imparting an electric current thereto while moving; and a circular electrode pressure cylinder for generating a force for pressing said circular electrodes against said overlapping portion of said members being welded, said circular electrode pressure cylinder having:

a plurality of pistons, wherein each of said pistons is capable of operating separately and the plurality of pistons are disposed in series along the direction of pressure applied to said circular electrodes so as to contact each other; and a plurality of cylinder portions for housing said pistons, the pressure output of said circular electrode pressure cylinder being capable of being set in a plurality of stages by allowing pistons in the end away from said circular electrodes to contact said pistons in the near end appropriately so as to be operate together and adding together the pressure output of each of said pistons.

2. The seam welding machine according to claim 1 wherein a spring is disposed between said circular electrodes and the piston closest to said electrodes to enable fluctuations in the position of said circular electrodes in the direction of application of pressure during welding relative to the set pressure output of said circular electrode pressure cylinder to be matched by variations in the flexure of said spring.

3. A seam welding machine comprising:

circular electrodes for applying pressure to an overlapping portion where edges of members being welded overlap and welding said overlapping portion by imparting an electric current thereto while moving;

a circular electrode pressure cylinder for generating a force for pressing said circular electrodes against said overlapping portion of said members being welded;

a pressure roller for compressing a weld made by said circular electrodes by the additional application of pressure; and a pressure roller cylinder for generating a force for pressing said pressure roller against said weld, comprising a pressure roller cylinder control means for allowing the force of said pressure roller to be applied to said weld by introducing pressure fluid into the pressure side and the back pressure side of said pressure roller cylinder before said pressure roller reaches the position of said weld and releasing said pressure fluid from said back pressure side of said pressure roller cylinder when said pressure roller reaches said position of said weld.

4. The seam welding machine according to claim 3 wherein a rapid exhaust valve is disposed in the immediate vicinity of said pressure roller cylinder, and said pressure fluid is released from said back pressure side using said rapid exhaust valve.

5. The seam welding machine according to claim 3 wherein said circular electrode pressure cylinder comprises:

a plurality of pistons, wherein each of said pistons is capable of operating separately and the plurality of pistons are disposed in series along the direction of pressure applied to said circular electrodes so as to contact each other; and a plurality of cylinder portions for housing said pistons, the pressure output of said circular electrode pressure cylinder being capable of being set in a plurality of stages by allowing pistons in the end away from said circular electrodes to contact said pistons in the near end appropriately so as to be operate together and adding together the pressure output of each of said pistons.

* * * * *